Jan. 10, 1933.  H. B. MARIS  1,893,676
TELEVISION SCANNING DISK
Filed Jan. 21, 1932   2 Sheets-Sheet 1
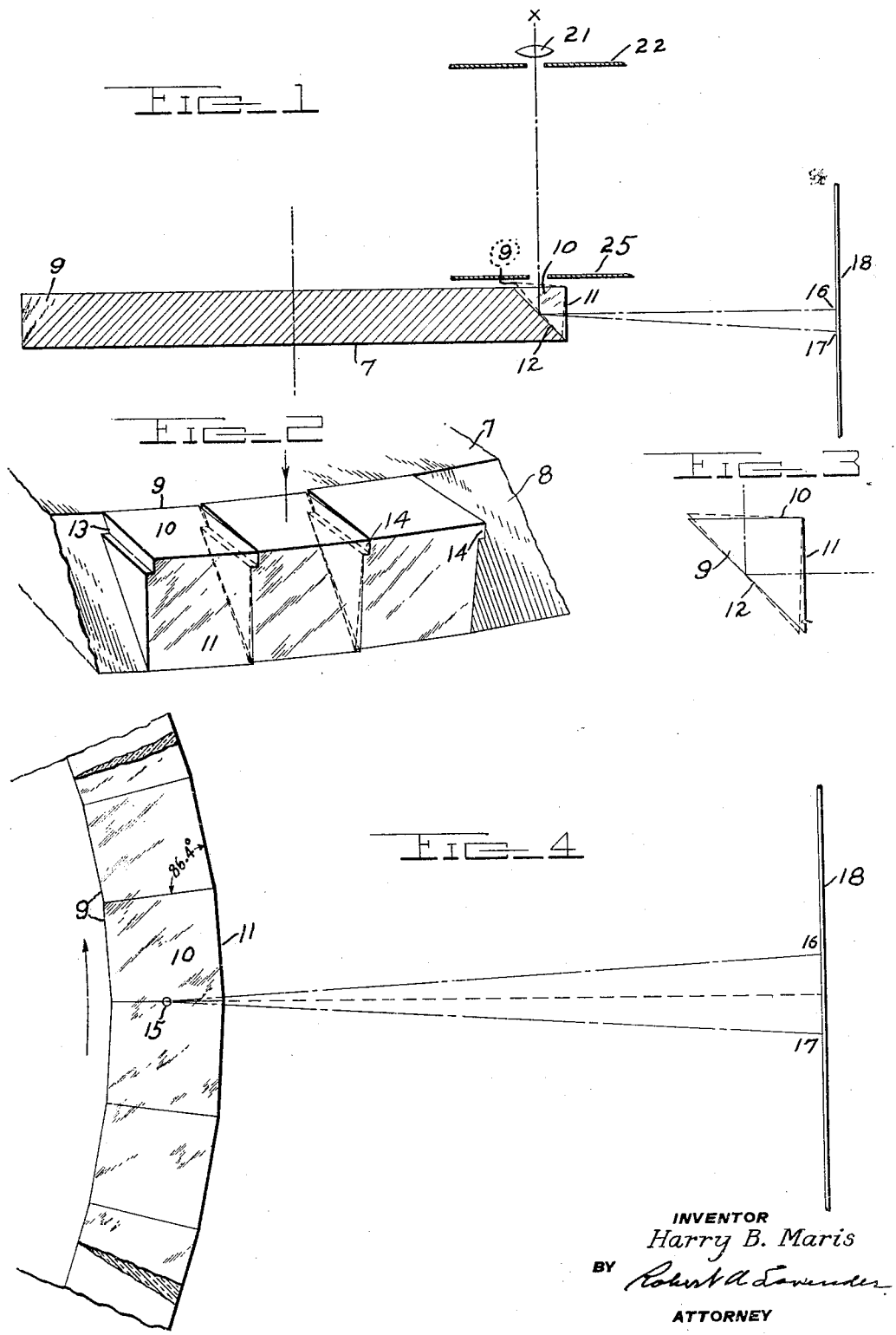
INVENTOR
Harry B. Maris
BY Robert A. Lavender
ATTORNEY

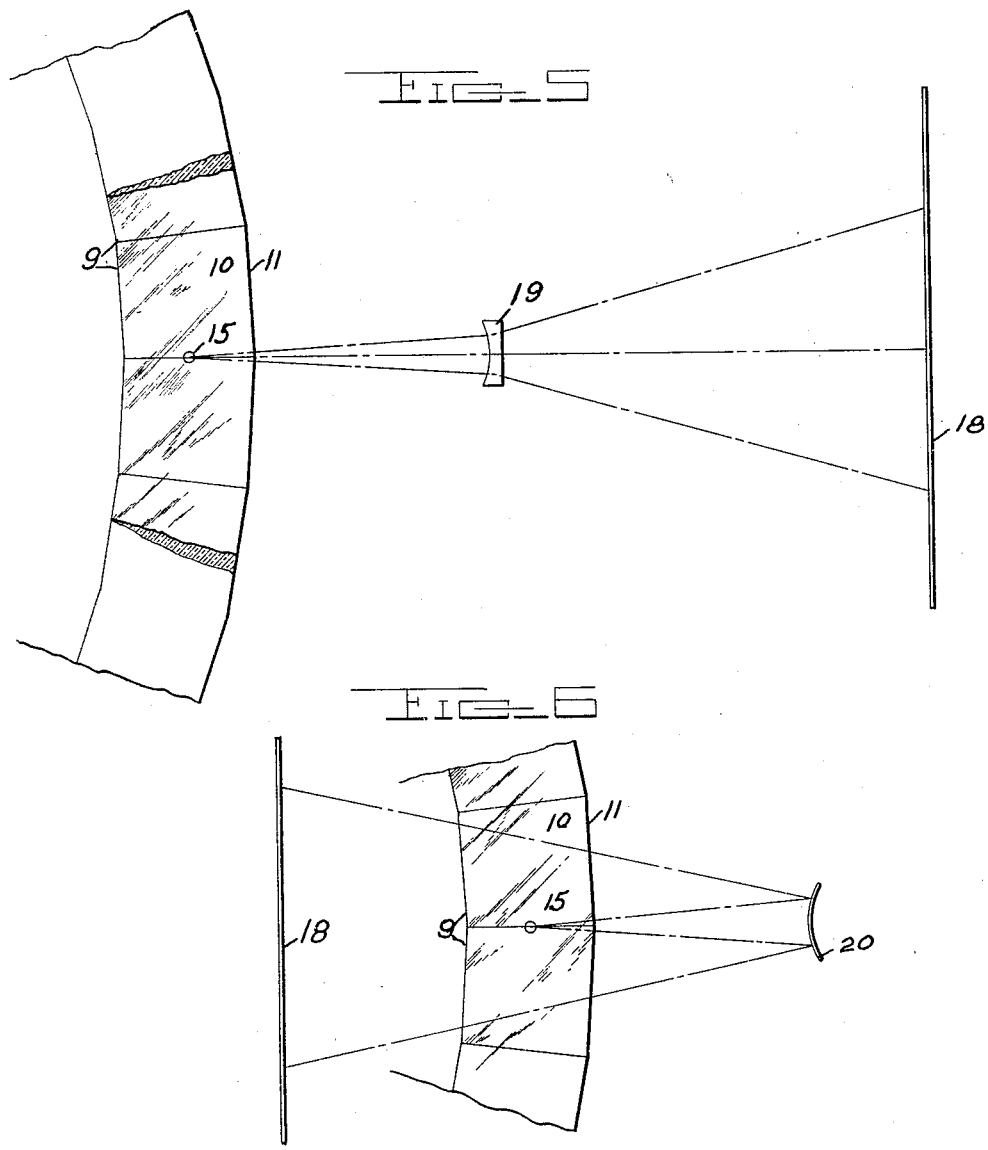

Patented Jan. 10, 1933

1,893,676

UNITED STATES PATENT OFFICE

HARRY B. MARIS, OF RIVERDALE, MARYLAND

TELEVISION SCANNING DISK

Application filed January 21, 1932. Serial No. 587,914.

(GRANTED UNDER THE ACT OF MARCH 3, 1883, AS AMENDED APRIL 30, 1928; 370 O. G. 757)

This invention relates to means for causing a beam of light to scan a picture, and more particularly to such a device having its elements so disposed that the beam of light travels parallel to the axis of rotation of the elements through part of its path, and at right angles thereto through another part thereof.

It is the object of my invention to provide a scanning disk with a plurality of reflecting elements on the periphery thereof, each of which elements has all of its optical surfaces optically plane and is offset from each adjacent element sufficiently to cause each element to scan a different line.

With the above and other objects in view, the invention consists in the construction, combination and arrangement of parts as will be described more fully hereinafter.

In the drawings:

Fig. 1 is a diametral section of my invention;

Fig. 2 is an edge view of a portion thereof, showing the offset between adjacent reflecting elements;

Fig. 3 is an end view of a single element, showing the path of the light therethrough and, in dotted lines, the position of an adjacent element;

Fig. 4 is a side view of a number of reflecting elements showing the paths of the light reflected from adjacent elements;

Figs. 5 and 6 show two means of increasing the size of the reproduced image at the receiving instrument.

Disk 7 has a suitably beveled periphery as indicated at 8 to seat reflecting prisms 9 having plane faces 10 and 11 at right angles to each other through which the light passes to and from reflecting surface 12 set at angles of 45° to faces 10 and 11. The number of prisms is equal to the number of lines it is desired to use in scanning, in the present instance being fifty to give fifty lines to the picture.

The angle between a face of any prism 9 and the axis of rotation is 4.3 minutes greater than the corresponding angle for the preceding prism in the direction of rotation of disk 7, except in the case of the prism that projects the light to form the first line of a picture, in which case it is 3 degrees 30.7 minutes less, when fifty prisms are used. This difference in orientation is sufficient to cause the light from each prism to scan a different line. While the angular difference of 4.3 minutes has been mentioned as being greater, or positive, it is obvious that the direction of tilt may be reversed and the scanning of the picture be started from the opposite end of the frame.

The retention of the prisms accurately in their proper relative positions is insured by forming a rabbet 13 in one edge of each, and a coacting offset 14 on the next adjacent prism to seat in the rabbet, the coacting faces of the rabbet and the offset that lie transversely of the axis of rotation being at an angle of 4.3 minutes to the plane of the faces 10 of the prisms, whereby the desired tilt of each prism with respect to those adjacent is secured. Facets lying at the required angle to fit against faces 12 of the prisms may be formed on the beveled portion 8 of disk 7, or suitable filling may be interposed between the faces 12 and the beveled portion 8 to provide a firm support for the prisms. The prisms may be cemented or otherwise secured to beveled portion 8. The ends of the prisms are carefully ground at such angles that adjacent prisms fit closely together and the entire series forms a continuous peripheral band without separation between any two of the prisms, the angles between the end faces and the faces 11 being $90°-(180/n)°$, $n$ being the number of prisms on the disk.

The positions of the beams from two adjacent prisms is indicated in Fig. 4, wherein an impinging pencil of rays is shown by circle 15 to pass partly into each of two adjacent prisms, the rays from the one prism being shown by line 15—16 as at the end of one line on screen 18 while those from the next following prism are indicated by line 15—17 as beginning the next line of the picture. It is to be understood that the impinging pencil stands perpendicular to the plane of the drawings.

The spread of lines 15—16 and 15—17 is 7.2° for a fifty line picture, or in general it is equal to 360° divided by the number of lines per frame. The solid angle of the picture may be increased by placing in the path of the reflected beam a dispersing lens 19 as in Fig. 5 or a dispersing mirror 20 as in Fig. 6.

The disk described above serves efficiently to scan a picture for reception when the beam, at the point of reflection has a cross sectional diameter not greater than $c/n^2$, $c$ being the circumference of the disk and $n$ the number of prisms thereon, and when the rays are so nearly parallel that the spread is reduced to an angle not greater than $2\pi/n^2$. For example, if the disk has a radius of 10 inches and the picture is to be scanned with fifty lines, the beam should have a diameter of 1/50 inch at the prism and a spread not in excess of 1/4 inch per 100 inches of beam path. A beam that will satisfy these conditions may be produced by passing the light from a source at X through a collimating lens 21, a 0.25 inch diameter aperture in screen 22 that is 100 inches from screen 23, and through an aperture having a diameter of 0.02 inch in the latter screen which is as close as possible to the prisms 9.

The apparatus can be used for transmission by reversing the path of the light therethrough, the subject being placed at the position of screen 18 in Fig. 1, and the light being allowed to fall upon a light-sensitive element after passage through the aperture in screen 22, either directly or after passing through lens 21 which will in this case act as a condensing lens and will permit the use of a smaller light-sensitive element than when the light falls directly thereon from the aperture in screen 22.

My invention is preferable to a disk having mirrors on the periphery, in that there is reflection from but one surface, whereas in mirrors there is reflection from both the front and the back surface and as the two do not coincide exactly, the resulting reflected image is not as clear cut and definite as when there is reflection from but one surface.

It will be observed that the reflected beam is at right angles to the incident beam and that one beam is parallel to the axis of rotation while the other is parallel to the plane of a face of the disk. This relation may be utilized to simplify the placing of the source of light, the screens, etc.

It will be understood that the above description and accompanying drawings comprehend only the general and preferred embodiment of my invention, and that various changes in construction, proportion and arrangement of parts may be made within the scope of the appended claims without sacrificing any of the advantages of this invention.

The invention described herein may be manufactured and used by or for the Government of the United States of America for government purposes without the payment of any royalty thereon.

I claim:

1. In a device of the class described, a rotatable member having a peripheral face inclined with respect to the axis of rotation, a plurality of totally reflecting prisms disposed on said face, the reflecting face and the transmitting faces of each of said prisms being optically plane, each of said prisms except two having a rabbet formed in one edge and an offset adapted to coact with the rabbet in an adjacent prism, the said rabbets and offsets having such angular relation to the faces of the prisms that each prism is tilted through a small angle with respect to adjacent prisms, the rabbets and offsets of the said excepted two prisms having such angular relations as to cause the said two prisms to have a reverse tilt substantially equal in magnitude to the sum of the angular tilts of all the other prisms, and means to cause a suitable beam of light to pass through said prisms seriatim as the said member is rotated.

2. In a device of the class described, a rotatable member having a peripheral face inclined with respect to the axis of rotation, and a plurality of totally reflecting prisms disposed on said face, the reflecting face and the transmitting faces of each of said prisms being optically plane, each of said prisms except two having a rabbet formed in one edge and an offset adapted to coact with the rabbet in an adjacent prism, the said rabbets and offsets having such angular relation to the faces of the prisms that each prism is tilted through a small angle with respect to adjacent prisms, the rabbets and offsets of the said excepted two prisms having such angular relations as to cause the said two prisms to have a reverse tilt substantially equal in magnitude to the sum of the angular tilts of all the other prisms.

HARRY B. MARIS.